(12) United States Patent
Liu et al.

(10) Patent No.: US 12,626,381 B2
(45) Date of Patent: May 12, 2026

(54) METHOD FOR REDUCING ERROR OF DEPTH ESTIMATION MODEL, ELECTRONIC DEVICE, AND NON-TRANSITORY STORAGE MEDIUM

(71) Applicant: HON HAI PRECISION INDUSTRY CO., LTD., New Taipei (TW)

(72) Inventors: Tsung-Wei Liu, New Taipei (TW); Chin-Pin Kuo, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 370 days.

(21) Appl. No.: 18/224,620

(22) Filed: Jul. 21, 2023

(65) Prior Publication Data

US 2024/0029281 A1 Jan. 25, 2024

(30) Foreign Application Priority Data

Jul. 22, 2022 (CN) .......................... 202210867058.0

(51) Int. Cl.
*G06T 7/521* (2017.01)
*G06T 7/73* (2017.01)

(52) U.S. Cl.
CPC ................ *G06T 7/521* (2017.01); *G06T 7/74* (2017.01)

(58) Field of Classification Search
CPC . G06T 7/521; G06T 7/74; G06T 2207/10016; G06T 2207/10028; G06T 2207/20081; G06T 7/55; G06T 7/30; G06T 7/73; G06T 7/80; G06T 2207/30244; G06V 10/764; G06V 10/774
See application file for complete search history.

(56) References Cited

U.S. PATENT DOCUMENTS

| | | | | |
|---|---|---|---|---|
| 2018/0322646 | A1* | 11/2018 | Matthies | ................ G06V 20/64 |
| 2019/0340775 | A1* | 11/2019 | Lee | ...................... G01S 17/931 |
| 2020/0160542 | A1* | 5/2020 | Kanzawa | ................ G06T 7/337 |
| 2020/0167941 | A1* | 5/2020 | Tong | ....................... G01S 13/89 |
| 2021/0004976 | A1* | 1/2021 | Guizilini | ................. G06T 7/521 |

(Continued)

FOREIGN PATENT DOCUMENTS

| | | | | | |
|---|---|---|---|---|---|
| CN | 106056664 | A | * 10/2016 | ............. | G06T 17/00 |
| CN | 110135485 | A | * 8/2019 | ............... | G06N 3/08 |

(Continued)

*Primary Examiner* — Henok Shiferaw
*Assistant Examiner* — Woo C Rhim
(74) *Attorney, Agent, or Firm* — ScienBiziP, P.C.

(57) ABSTRACT

A method for reducing the error of depth estimation model comprises: obtaining a plurality of monocular images and a point cloud data of each of the plurality of monocular images, wherein each of the plurality of monocular images comprises an object frame image and a reference frame image; reconstructing the object frame image to obtain a reconstructed frame image according to the reference frame image and a first depth estimation model; determining a reconstructed error between the object frame image and the reconstructed frame image; and obtaining an inertia probability of each pixel of the object frame image according to speed information of the point cloud data and pixel information of the object frame image. This application provides more accurate depth estimation results for dynamic scenes. An electronic device and a non-transitory storage recording the method are also disclosed.

20 Claims, 5 Drawing Sheets

(56)         References Cited

U.S. PATENT DOCUMENTS

| | | | |
|---|---|---|---|
| 2021/0042997 A1 * | 2/2021 | Vechersky | G06T 7/20 |
| 2021/0122367 A1 * | 4/2021 | Yao | G06T 7/593 |
| 2021/0264624 A1 * | 8/2021 | Fu | G06V 10/762 |
| 2021/0264629 A1 * | 8/2021 | Swope | G06T 7/521 |
| 2021/0312650 A1 * | 10/2021 | Ye | G06T 7/174 |
| 2021/0398301 A1 * | 12/2021 | Guizilini | G06T 7/70 |
| 2022/0237750 A1 * | 7/2022 | Pan | G06T 7/70 |
| 2023/0230264 A1 * | 7/2023 | Guizilini | G06T 7/55 |
| | | | 382/106 |
| 2023/0245391 A1 * | 8/2023 | Adkinson | G06T 15/04 |
| | | | 345/419 |
| 2023/0326056 A1 * | 10/2023 | Tokunaga | H04N 23/45 |
| | | | 382/100 |
| 2024/0029281 A1 * | 1/2024 | Liu | G06T 7/55 |
| 2024/0029283 A1 * | 1/2024 | Liu | G06T 7/55 |

FOREIGN PATENT DOCUMENTS

| | | | | |
|---|---|---|---|---|
| CN | 111386550 A | * | 7/2020 | G06N 3/045 |
| CN | 112446227 A | * | 3/2021 | G06V 20/00 |
| TW | 202141428 A | * | 11/2021 | G06T 7/50 |
| TW | 202204853 A | * | 2/2022 | |

* cited by examiner

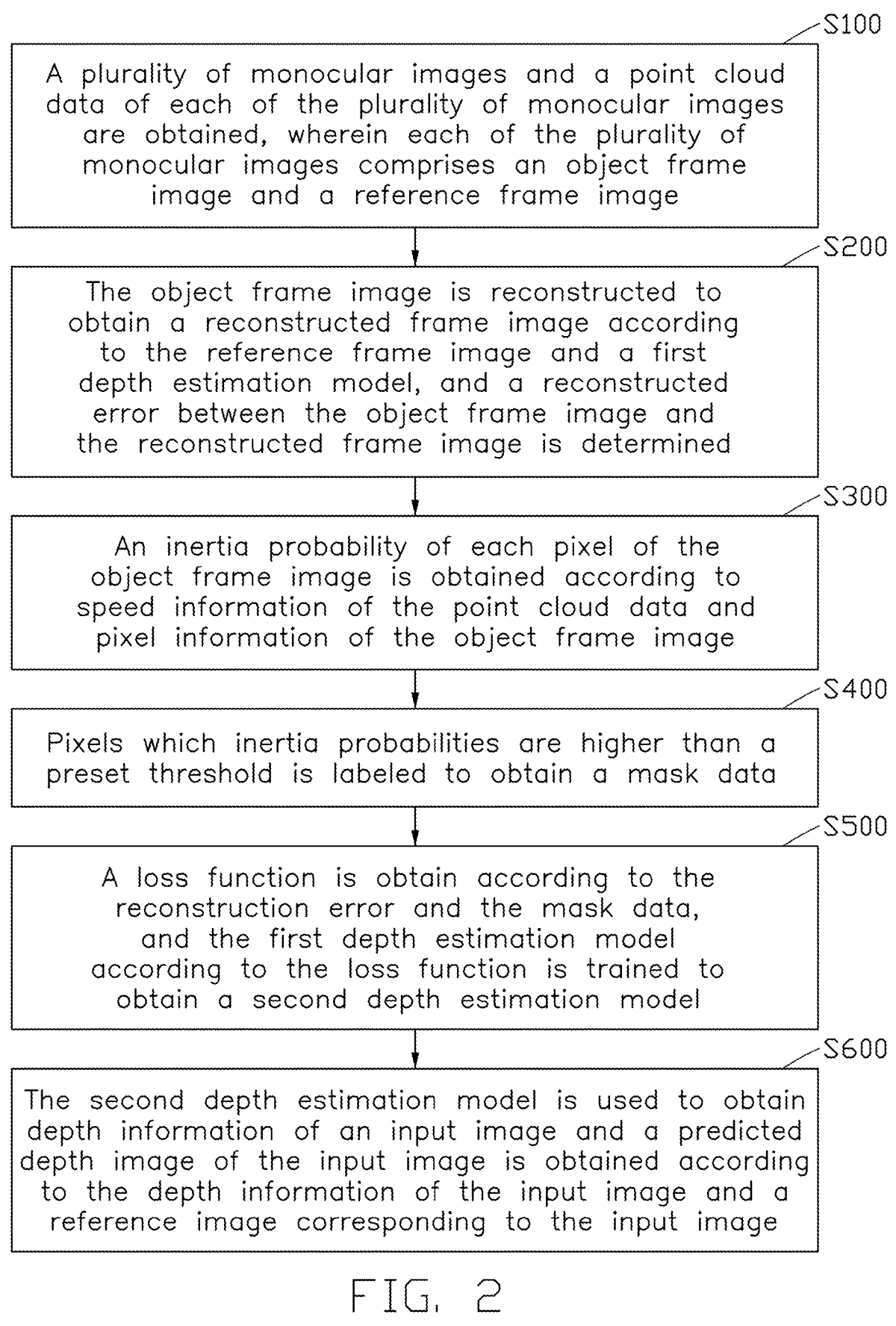

S100

A plurality of monocular images and a point cloud data of each of the plurality of monocular images are obtained, wherein each of the plurality of monocular images comprises an object frame image and a reference frame image

S200

The object frame image is reconstructed to obtain a reconstructed frame image according to the reference frame image and a first depth estimation model, and a reconstructed error between the object frame image and the reconstructed frame image is determined

S300

An inertia probability of each pixel of the object frame image is obtained according to speed information of the point cloud data and pixel information of the object frame image

S400

Pixels which inertia probabilities are higher than a preset threshold is labeled to obtain a mask data

S500

A loss function is obtain according to the reconstruction error and the mask data, and the first depth estimation model according to the loss function is trained to obtain a second depth estimation model

S600

The second depth estimation model is used to obtain depth information of an input image and a predicted depth image of the input image is obtained according to the depth information of the input image and a reference image corresponding to the input image

FIG. 2

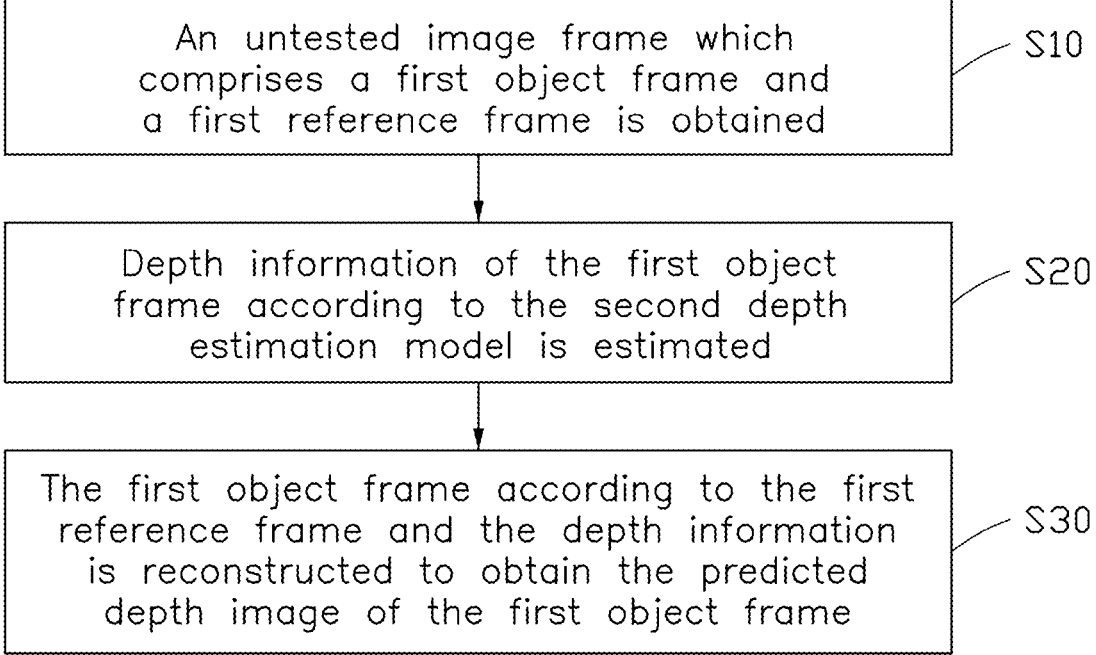

An untested image frame which comprises a first object frame and a first reference frame is obtained — S10

Depth information of the first object frame according to the second depth estimation model is estimated — S20

The first object frame according to the first reference frame and the depth information is reconstructed to obtain the predicted depth image of the first object frame — S30

FIG. 3

METHOD FOR REDUCING ERROR OF DEPTH ESTIMATION MODEL, ELECTRONIC DEVICE, AND NON-TRANSITORY STORAGE MEDIUM

TECHNICAL FIELD

The subject matter herein generally relates to computer vision.

BACKGROUND

How to recover the depth information of the scene from 2D images sequentially collected into a 3D scene is an important research content in the field of computer vision. Monocular depth estimation is an important method to understand the geometric relationship of 3D scenes. The monocular depth estimation refers to the process of obtaining the depth data corresponding to a picture or a video by processing the picture or the video taken by the monocular camera. The video captured by monocular camera is called a monocular video. When shooting a monocular video, there may be differences between adjacent frames in the captured monocular video due to uncontrollable factors, such as shaking of the camera, object movement in the shooting scene, and noise. These factors can lead to large jitter in monocular depth estimation of the monocular video, and the depth data of two adjacent video frames can be quite different.

In order to suppress the jittering of the camera, at present, according to the images from different time and perspective, the deep learning method of monocular depth estimation mainly uses the SFM (Structure From Motion) principle to let the model infer the object depth, and reconstructs the image of the object perspective using the reference image. The reconstructed image from the depth estimation with lower error rates can be closer to the original object image, but the reconstructed image similarity cannot accurately represent the degree of depth error in the following scenarios because moving objects do not conform to SFM's viewpoint pose transformation and cannot be correctly reconstructed.

The existing technology can not completely filter out moving objects in the process of training the monocular depth estimation model, which makes the accuracy of the model depth estimation low, and the model parameters cannot be optimized.

BRIEF DESCRIPTION OF THE DRAWINGS

Implementations of the present disclosure will now be described, by way of embodiments, with reference to the attached figures.

FIG. 2 is a flowchart of an embodiment of the method of FIG. 1.

FIG. 3 is a flowchart of an embodiment of a depth estimation method.

DETAILED DESCRIPTION

Figure 1:
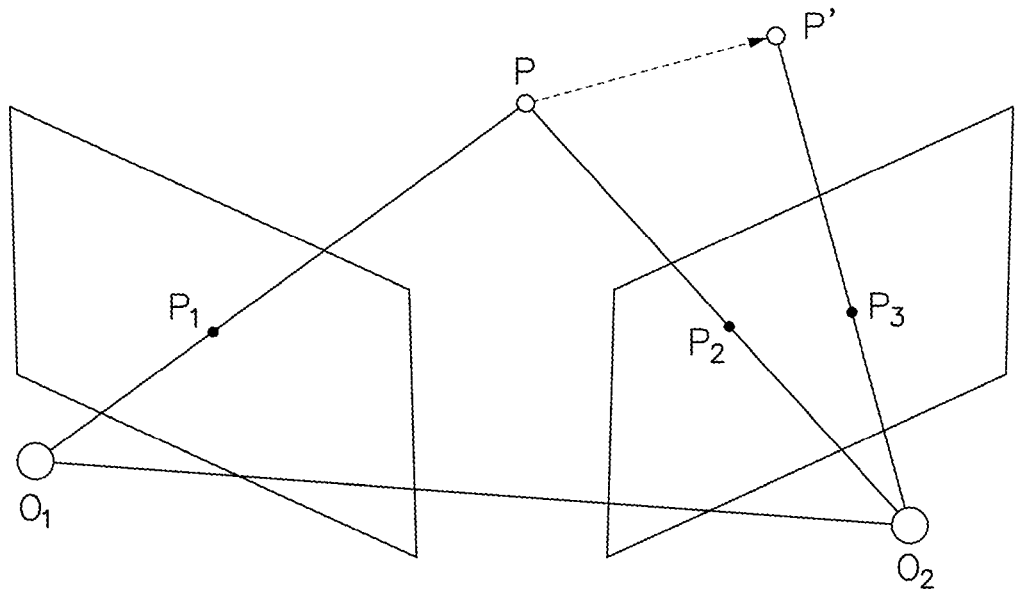
FIG. 1 is an application scenario diagram of an embodiment of a method for reducing the error of depth estimation model.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure. It should be noted that references to "an" or "one" embodiment in this disclosure are not necessarily to the same embodiment, and such references mean "at least one".

Several definitions that apply throughout this disclosure will now be presented.

The connection can be such that the objects are permanently connected or releasably connected. The term "comprising," when utilized, means "including, but not necessarily limited to"; it specifically indicates open-ended inclusion or membership in the so-described combination, group, series, and the like.

The method provided by this embodiment is mainly applied to a dynamic environment containing dynamic objects. As shown in FIG. 1, a dynamic object can be an object whose is P in the monocular camera $O_1$ perspective at the previous moment, but P' in the monocular camera $O_2$ perspective at the latter moment. The projection point of P' from the perspective of monocular camera $O_2$ is $P_3$, $(P_1, P_3)$ that is the feature point matching of dynamic object. The feature point matching of $(P_1, P_3)$ dynamic objects is different from the perspective transformation pose relationship obtained by the feature point matching of $(P_1, P_2)$ of static objects, the perspective transformation pose relationship is used in the modeling of static objects, and cannot completely filter out moving objects, so that the accuracy of the model has a large error.

FIG. 2 illustrates one exemplary embodiment of an image depth estimation method. The flowchart presents an exemplary embodiment of the method. The exemplary method is provided by way of example, as there are a variety of ways to carry out the method. Each block shown in FIG. 2 may represent one or more processes, methods, or subroutines, carried out in the example method. Furthermore, the illustrated order of blocks is illustrative only and the order of the blocks can change. Additional blocks can be added or fewer blocks may be utilized, without departing from this disclosure. The example method can be begin at block S100.

In block S100, a plurality of monocular images and a point cloud data of each of the plurality of monocular images are obtained, wherein each of the plurality of monocular images comprises an object frame image and a reference frame image.

In one embodiment, the monocular images of containing dynamic objects in the current environment can be obtained by a monocular cameras, such as a RGB cameras or an IR cameras. Due to the advantages of convenient installation, small size and low cost of the monocular camera, the surrounding environment information is captured by a monocular camera, it is a broader application prospect in the field of depth estimation.

In one embodiment the acquisition method of point cloud data comprises: the monocular image frames are scanned by using a lidar to obtain a point cloud data of the lidar.

In one embodiment, before the first depth estimation model is trained by using the object frame image and the reference frame image, the object frame image and the reference frame image are corrected and calibrated to enhance an effectiveness of training first depth model.

In one embodiment, continuous object frame images and reference frame images are extracted from monocular images to train data in the process of training the first depth estimation model, so the acquisition cost of the training data reduces when the first depth estimation model is training. Moreover, it can effectively avoid a large of external image information, guarantee the learning modeling ability of the first depth estimation model and reduce the training cost of the first depth estimation model. For example, the number of object frame images and reference frame image can be one or more, this is not limited in any embodiment.

In block S200, the object frame image is reconstructed to obtain a reconstructed frame image according to the reference frame image and a first depth estimation model, and a reconstructed error between the object frame image and the reconstructed frame image is determined.

In one embodiment, the object frame image is estimated by the first depth estimation model to obtain the depth information of the object frame image. The object frame image and the reference frame image are input into a preset pose estimation model to obtain a camera pose change information between the object frame image and the reference frame image. The object frame image is reconstructed by the depth information and camera pose changes to obtain the reconstructed frame image corresponding to the object frame image. The brightness difference between the object frame image and the reconstructed frame image is calculated to obtain the reconstruction error. Among them, the preset pose estimation model is the existing mature technology, and it is not described in detail.

In one embodiment, the image brightness can be understood as the brightness and the darkness degree of the image. The brightness difference information can be determined by the object frame image taken by the monocular camera at the previous time and the reference frame image taken by the monocular camera at the later time. In the process of image brightness recognition, the brightness difference information can be calculated the error between the obtained brightness and the actual brightness, it is the reconstruction error between the object frame image and the reconstructed frame image.

In one embodiment, it can apply any possible way to determine the brightness difference between the object frame image and the reconstructed frame image, such as model matching, engineering, image process and so no.

In block S300, an inertia probability of each pixel of the object frame image is obtained according to speed information of the point cloud data and pixel information of the object frame image.

In one embodiment, according to the speed information of the point cloud data and the pixel information of the object frame image, the initial inertia probability $P_r(x)$ of each pixel x for different point cloud r is calculated. The initial inertia probability $P_r(x)$ of each pixel x for different point cloud r is fused by using the non-maximum suppression algorithm NMS (Non Maximum Suppression), and the maximum initial inertia probability $P_r(x)$ is selected as the inertia probability $P(x)$ of each pixel x.

Further, a calculation formula of the initial inertia probability comprises:

$$P_r(x)=c(x,r)s(I(x),I(r)).$$

4

Wherein $P_r(x)$ is an initial inertia probability of each pixel for different point clouds, x is each pixel, r is each point cloud, $I(x)$ is a color of each pixel x, $I(r)$ is a color of each point cloud r, c (closeness function) is a similarity function and a gaussian distribution, the closer the pixel x is to the point cloud r, the higher the c value. And s (similarity function) is a similarity function and also a gaussian distribution, the closer the color of the pixel x to the point cloud r, the higher the s value.

Further, the calculation formula of the initial inertia probability $P(x)$ comprises:

$$P(x)=NMS_{r\in R}(P_r(x)).$$

Where, the inertia probability $P(x)$ is the probability that the pixel x belongs to a dynamic object.

In block S400, pixels which inertia probabilities are higher than a preset threshold is labeled to obtain a mask data.

In one embodiment, a preset threshold is set according to the test results, the marking inertial probability $P(x)$ is higher than the region of the preset threshold T to obtain the mask data. Mask data avoids loss values of dynamic object affecting learning when a model is training, excluding moving objects.

In block S500, a loss function is obtain according to the reconstruction error and the mask data, and the first depth estimation model according to the loss function is trained to obtain a second depth estimation model.

The method can exclude all moving objects in the monocular image, which overcomes the disadvantage that the original method can only exclude objects moving at the same speed relative to the camera, and eliminates the influence caused by moving objects in dynamic scenes. At the same time, the system error of the first depth estimation model is corrected by iterative solution, and the object depth estimation accuracy of the depth estimation model is improved.

In one embodiment, the loss function comprises those content. Assuming that the reconstruction error is D, the mask data is M, and the loss function is L, and the calculation formula is as follows:

$$M(x) = \begin{cases} 1, & \text{\&if } P(x) > T \\ 0, & \text{\&else} \end{cases};$$

$$\text{Loss} = DM.$$

Wherein the reconstruction error D is a picture with a size of W*H, and the pixel x is an error value, the mask data M is also a picture with a size of W*H, a value of x is 0-1.

Wherein loss function Loss is the product of reconstruction error D and mask data M. The result of loss function Loss will retain the error value of reconstruction error D when the pixel value of mask data M is 1, and the retained error value will be taken as the final loss value after averaging. Based on the loss value, the first depth estimation model can be trained to obtain the object depth estimation model.

In block S600, the second depth estimation model is used to obtain depth information of an input image and a predicted depth image of the input image is obtained according to the depth information of the input image and a reference image corresponding to the input image.

In one embodiment, as shown in FIG. 3, the block S600 can also comprise:

S10, an untested image frame which comprises a first object frame and a first reference frame is obtained.

S20, depth information of the first object frame according to the second depth estimation model is estimated.

S30, the first object frame according to the first reference frame and the depth information is reconstructed to obtain the predicted depth image of the first object frame.

Specifically, an untested image can be either a static image or a dynamic video.

In this embodiment, continuous first object frame and first reference frames are extracted from an untested image, the first object frame is input into the second depth estimation model to obtain the depth information of the first object frame. Then, the first object frame is reconstructed according to the first reference frame and depth information to obtain the predicted depth image of the first object frame. Since the second depth estimation model is trained based on the loss function obtained by the reconstruction error and the mask data, the more accurate prediction depth image can be obtained when the second depth estimation model is used to estimate the depth of the image to be measured, so that a more accurate depth estimation result of the dynamic scene can be obtained.

In one embodiment a reconstructed frame image is obtained by a reference frame image and a first depth estimation model to determine the reconstruction error between the object frame image and the reconstructed frame image. According to the speed information of the point cloud data and the pixel information of the object frame image, the inertia probability of each pixel is obtained. A marking inertia probability is higher than each pixel of the preset threshold to obtain mask data. The loss function is obtained from the reconstruction error and mask data to obtain the second depth estimation model, which can effectively improve the modeling ability of the second depth estimation model for the expression of the depth features of the image.

The method can significantly improve the accuracy of the depth image when estimating the depth image of the monocular image in the video sequence, so as to obtain more accurate depth estimation results of the dynamic scene.

Figure 4:
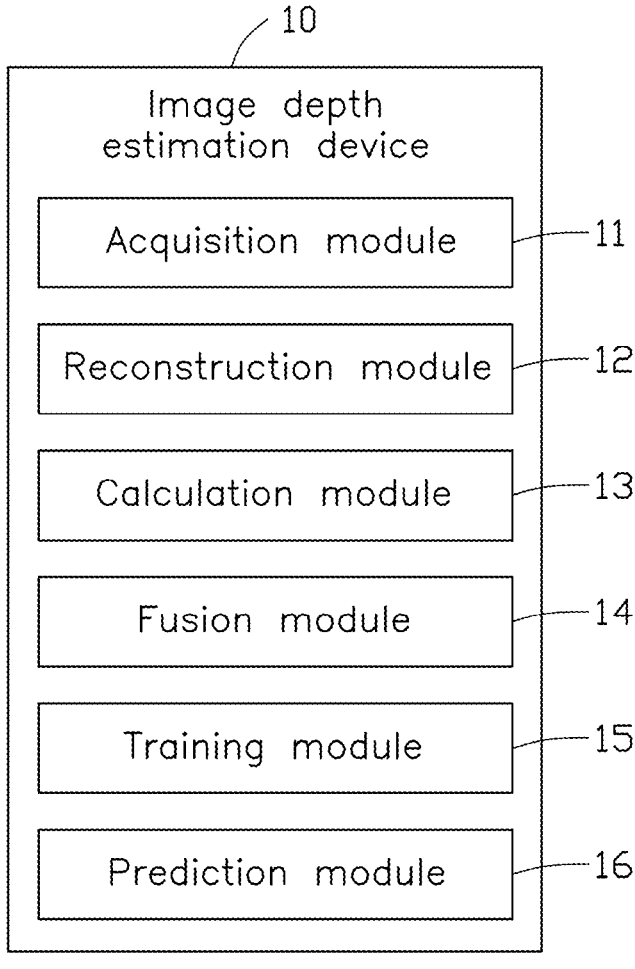
FIG. 4 is a block diagram of an embodiment of a device for reducing the error of depth estimation model.

Please refer to FIG. 4, FIG. 4 shows an image depth estimation device 10. The image depth estimation device 10 can be applied to the image depth estimation method in the above embodiment. In order to facilitate the explanation, the device 10 only shows the part related to the implementation example of this application. Technicians in this field can understand that the graphic structure does not constitute a limit to the device 10, and can include more or less components than the graphic, or combine some components, or different component arrangements.

In this embodiment, the device 10 comprises: an acquisition module 11, a reconstruction module 12, a calculation module 13, a fusion module 14, a training module 15 and a prediction module 16. The acquisition module 11 obtains a plurality of monocular images and a point cloud data of each of the plurality of monocular images, wherein each of the plurality of monocular images comprises an object frame image and a reference frame image; the reconstruction module 12 reconstructs the object frame image to obtain a reconstructed frame image according to the reference frame image and a first depth estimation model and determines a reconstructed error between the object frame image and the reconstructed frame image; the calculation module 13 obtains an inertia probability of each pixel of the object frame image according to speed information of the point cloud data and pixel information of the object frame image; the fusion module 14 labels pixels which inertia probabilities are higher than a preset threshold to obtain a mask data; the training module 15 obtains a loss function according to the reconstruction error and the mask data, and trains the first depth estimation model according to the loss function to obtain a second depth estimation model; the prediction module 16 uses the second depth estimation model to obtain depth information of the monocular images and obtains a predicted depth image of the monocular images according to the depth information.

Figure 5:
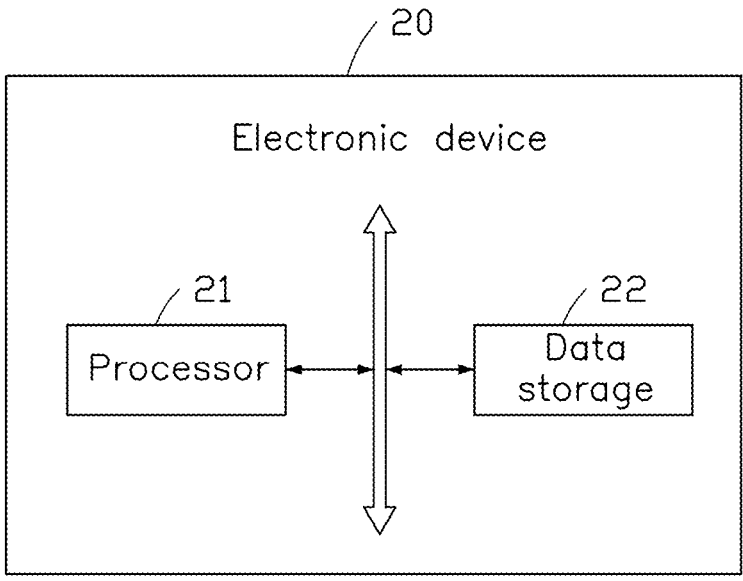
FIG. 5 is an architecture diagram of an electronic device.

As shown in FIG. 5, one exemplary embodiment of an electronic device 20 comprises at least one processor 21 and a data storage 22. The data storage 22 stores one or more programs which can be executed by the at least one processor 21. The data storage 22 is used to store instructions, and the processor 21 is used to call up instructions from the data storage 22, so that the electronic device 20 performs the steps of the image depth estimation method in the above embodiment. The electronic devices 20 can be desktop computers, laptops, handheld computers, cloud servers and other computing devices. The electronic devices 20 can interact with users through keyboard, mouse, remote control, touchpad or voice control devices.

In one embodiment, a non-transitory storage medium recording instructions is disclosed. When the recorded computer instructions are executed by a processor of an electronic device 20, the electronic device 20 can perform the method.

The embodiments shown and described above are only examples. Many details known in the field are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. An image depth estimation method, comprising:
  obtaining a plurality of monocular images and a point cloud data of each of the plurality of monocular images, wherein each of the plurality of monocular images comprises an object frame image and a reference frame image;
  reconstructing the object frame image to obtain a reconstructed frame image according to the reference frame image and a first depth estimation model;
  determining a reconstructed error between the object frame image and the reconstructed frame image;
  obtaining an inertia probability of each pixel of the object frame image according to speed information of the point cloud data and pixel information of the object frame image;
  labeling pixels which inertia probabilities are higher than a preset threshold to obtain a mask data;
  obtaining a loss function according to the reconstructed error and the mask data, and training the first depth estimation model according to the loss function to obtain a second depth estimation model; and
  using the second depth estimation model to obtain depth information of an input image and obtaining a predicted depth image of the input image according to the depth information of the input image and a reference image corresponding to the input image.

2. The image depth estimation method of claim 1, wherein obtaining the inertia probability of each pixel of the object frame image according to the speed information of the point cloud data and the pixel information of the object frame image comprises:

calculating an initial inertia probability of each pixel with respect to each point cloud according to the speed information of the point cloud data and the pixel information of the object frame image; and fusing the initial inertia probability of each pixel with respect to each point cloud by using a non-maximum suppression algorithm and selecting a maximum initial inertia probability as the inertia probability of each pixel.

3. The image depth estimation method of claim 2, wherein a calculation formula of the initial inertia probability comprises:

$$P_r(x)=c(x,r)s(I(x),I(r));$$

wherein $P_r(x)$ is the initial inertia probability of each pixel for different point clouds, x is each pixel, r is each point cloud, I(x) is a color of each pixel x, I(r) is a color of each point cloud r, c is a similarity function, and s is a similarity function.

4. The image depth estimation method of claim 2, wherein reconstructing the object frame image to obtain the reconstructed frame image according to the reference frame image and the first depth estimation model comprises:

estimating a depth information of the object frame image according to the first depth estimation model;

inputting the object frame image and the reference frame image into a preset pose estimation model to obtain a camera pose change information between the object frame image and the reference frame image; and reconstructing the object frame image according to the depth information of the object frame image and the camera pose change information to obtain the reconstructed frame image corresponding to the object frame image.

5. The image depth estimation method of claim 2, wherein determining the reconstructed error between the object frame image and the reconstructed frame image comprises:

calculating a luminosity difference between the object frame image and the reconstructed frame image to obtain the reconstructed error.

6. The image depth estimation method of claim 2, wherein obtaining a predicted depth image of the input image according to the depth information of the input image and a reference image corresponding to the input image comprises:

using the second depth estimation model to reconstruct the input image to obtain the predicted depth image according to the reference image corresponding to the input image and the depth information of the input image.

7. The image depth estimation method of claim 2, wherein an acquisition method of the point cloud comprises:

scanning the monocular image frames by using a lidar to obtain the point cloud data of the lidar.

8. An electronic device, comprising:

at least one processor; and a data storage storing one or more programs which when executed by the at least one processor, cause the at least one processor to:

obtain a plurality of monocular images and a point cloud data of each of the plurality of monocular images, wherein each of the plurality of monocular images comprises an object frame image and a reference frame image;

reconstruct the object frame image to obtain a reconstructed frame image according to the reference frame image and a first depth estimation model;

determine a reconstructed error between the object frame image and the reconstructed frame image;

obtain an inertia probability of each pixel of the object frame image according to speed information of the point cloud data and pixel information of the object frame image;

label pixels which inertia probabilities are higher than a preset threshold to obtain a mask data;

obtain a loss function according to the reconstructed error and the mask data, and train the first depth estimation model according to the loss function to obtain a second depth estimation model; and use the second depth estimation model to obtain depth information of an input image and obtain a predicted depth image of the input image according to the depth information of the input image and a reference image corresponding to the input image.

9. The electronic device of claim 8, wherein obtaining the inertia probability of each pixel of the object frame image according to the speed information of the point cloud data and the pixel information of the object frame image comprises:

calculating an initial inertia probability of each pixel with respect to each point cloud according to the speed information of the point cloud data and the pixel information of the object frame image; and fusing the initial inertia probability of each pixel with respect to each point cloud by using a non-maximum suppression algorithm and selecting a maximum initial inertia probability as the inertia probability of each pixel.

10. The electronic device of claim 9, wherein a calculation formula of the initial inertia probability comprises:

$$P_r(x)=c(x,r)s(I(x),I(r));$$

wherein $P_r(x)$ is the initial inertia probability of each pixel for different point clouds, x is each pixel, r is each point cloud, I(x) is a color of each pixel x, I(r) is a color of each point cloud r, c is a similarity function, and s is a similarity function.

11. The electronic device of claim 9, wherein reconstructing the object frame image to obtain the reconstructed frame image according to the reference frame image and the first depth estimation model comprises:

estimating a depth information of the object frame image according to the first depth estimation model;

inputting the object frame image and the reference frame image into a preset pose estimation model to obtain a camera pose change information between the object frame image and the reference frame image; and reconstructing the object frame image according to the depth information of the object frame image and the camera pose change information to obtain the reconstructed frame image corresponding to the object frame image.

12. The electronic device of claim 9, wherein determining the reconstructed error between the object frame image and the reconstructed frame image comprises:

calculating a luminosity difference between the object frame image and the reconstructed frame image to obtain the reconstructed error.

13. The electronic device of claim 9, wherein obtaining a predicted depth image of the input image according to the depth information of the input image and a reference image corresponding to the input image comprises:

using the second depth estimation model to reconstruct the input image to obtain the predicted depth image according to the reference image corresponding to the input image and the depth information of the input image.

14. The electronic device of claim 9, wherein an acquisition method of the point cloud comprises:

scanning the monocular image frames by using a lidar to obtain the point cloud data of the lidar.

15. A non-transitory computer readable medium having stored thereon instructions that, when executed by a processor of an electronic device, causes the electronic device to perform an image depth estimation method, the image depth estimation method comprising:

obtaining a plurality of monocular images and a point cloud data of each of the plurality of monocular images, wherein each of the plurality of monocular images comprises an object frame image and a reference frame image;

reconstructing the object frame image to obtain a reconstructed frame image according to the reference frame image and a first depth estimation model;

determining a reconstructed error between the object frame image and the reconstructed frame image;

obtaining an inertia probability of each pixel of the object frame image according to speed information of the point cloud data and pixel information of the object frame image;

labeling pixels which inertia probabilities are higher than a preset threshold to obtain a mask data;

obtaining a loss function according to the reconstructed error and the mask data, and training the first depth estimation model according to the loss function to obtain a second depth estimation model; and using the second depth estimation model to obtain depth information of an input image and obtaining a predicted depth image of the input image according to the depth information of the input image and a reference image corresponding to the input image.

16. The non-transitory computer readable medium of claim 15, wherein obtaining the inertia probability of each pixel of the object frame image according to the speed information of the point cloud data and the pixel information of the object frame image comprises:

calculating an initial inertia probability of each pixel with respect to each point cloud according to the speed information of the point cloud data and the pixel information of the object frame image; and fusing the initial inertia probability of each pixel with respect to each point cloud by using a non-maximum suppression algorithm and selecting a maximum initial inertia probability as the inertia probability of each pixel.

17. The non-transitory computer readable medium of claim 16, wherein a calculation formula of the initial inertia probability comprises:

$$P_r(x) = c(x,r)s(I(x),I(r));$$

wherein $P_r(x)$ is the initial inertia probability of each pixel for different point clouds, x is each pixel, r is each point cloud, $I(x)$ is a color of each pixel x, $I(r)$ is a color of each point cloud r, c is a similarity function, and s is a similarity function.

18. The non-transitory computer readable medium of claim 16, wherein reconstructing the object frame image to obtain the reconstructed frame image according to the reference frame image and the first depth estimation model comprises:

estimating a depth information of the object frame image according to the first depth estimation model;

inputting the object frame image and the reference frame image into a preset pose estimation model to obtain a camera pose change information between the object frame image and the reference frame image; and reconstructing the object frame image according to the depth information of the object frame image and the camera pose change information to obtain the reconstructed frame image corresponding to the object frame image.

19. The non-transitory computer readable medium of claim 16, wherein determining the reconstructed error between the object frame image and the reconstructed frame image comprises:

calculating a luminosity difference between the object frame image and the reconstructed frame image to obtain the reconstructed error.

20. The non-transitory computer readable medium of claim 16, wherein obtaining a predicted depth image of the input image according to the depth information of the input image and a reference image corresponding to the input image comprises:

using the second depth estimation model to reconstruct the input image to obtain the predicted depth image according to the reference image corresponding to the input image and the depth information of the input image.

\* \* \* \* \*